United States Patent [19]
Nagata

[11] Patent Number: 5,926,345
[45] Date of Patent: Jul. 20, 1999

[54] CONTACT MAGNETIC HEAD HAVING A SOFTENING PORTION

[75] Inventor: Seiichi Nagata, Nagoya, Japan

[73] Assignees: Daido Tokushuko Kabushiki Kaisha, Aichi; Japan Science and Technology Corporation, Saitama, both of Japan

[21] Appl. No.: 08/947,636

[22] Filed: Oct. 9, 1997

[30] Foreign Application Priority Data

Oct. 9, 1996 [JP] Japan .................................... 8-287649

[51] Int. Cl.[6] .............................. G11B 5/48; G11B 21/16
[52] U.S. Cl. ........................................................ 360/104
[58] Field of Search .................................... 360/102–104

[56] References Cited

U.S. PATENT DOCUMENTS

5,200,867  4/1993  Albrecht et al. ......................... 360/103
5,781,379  7/1998  Erpelding et al. ....................... 360/104

*Primary Examiner*—George J. Letscher
*Attorney, Agent, or Firm*—Bacon & Thomas

[57] ABSTRACT

A contact magnetic head includes a main body and at least three contact pads that contact a magnetic disk, one of which is arranged to send or receive magnetic signals from a disk. A portion of the main body situated between the contact pads has a hardness or deformation characteristic of at least 0.25 mm/kgf, thereby softening that portion of the main body to prevent vibrations of the area of the main body provided with the at least one signal sending/receiving pad.

8 Claims, 7 Drawing Sheets

CONTACT MAGNETIC HEAD HAVING A SOFTENING PORTION

BACKGROUND OF THE INVENTION

1. Field of the Invention

The present invention relates to a contact magnetic head conducting magnetic records and reproductions with respect to a magnetic disk while a contact pad is brought into contact with the magnetic disk.

2. Description of the Related Art

In a contact magnetic head of this type which has been proposed, a main unit which is a mechanical base is provided with three contact pads including a magnetic pad for sending a magnetic signal to or receiving the signal from a magnetic head so that the contact pads are brought into contact with the magnetic heads, respectively.

In such a contact magnetic head, since the magnetic head comes into contact with the contact pads at three points, the magnetic pad can be stably brought into contact with the magnetic disk at a predetermined angle with respect to the magnetic disk in a given direction. As a result, the magnetic pad can magnetically record a magnetic signal on or reproduce the signal from the magnetic disk in a stable manner.

If the run-out of the center of the shaft of the magnetic disk or irregular rotation of the magnetic disk occurs at the time of rotation of the magnetic disk, complex vibrational force is given to the magnetic head in the areas where the magnetic disk contacts with the magnetic head. In the conventional contact magnetic head, since a plurality of contact pads contact with the magnetic disk, if the run-out of the center of the shaft of the magnetic disk or irregular rotation of the magnetic disk occurs at the time of rotation of the magnetic disk, the aforesaid vibrational force is given from the magnetic disk to the magnetic head via the respective contact pads. If the frequency of the vibration of the magnetic head caused by the vibrational force applied to the magnetic head from the magnetic disk matches the inherent vibration frequency of the magnetic head, the magnetic head causes resonance and vibrates vigorously. If the magnetic head vibrates vigorously, the distance between the magnetic pads and the surface of the magnetic disk changes greatly. The change in the distance results in variations in the intensity of the magnetic signal applied to the magnetic disk from the magnetic pads or the magnetic signal read from the magnetic disk by the magnetic pads. The variations in the intensity of the magnetic signal result in an erroneous signal.

SUMMARY OF THE INVENTION

It is an object of the present invention to provide a contact magnetic head in which three or more contact pads contact with the magnetic disk so that magnetic pads contained in the respective contact pads stably contact with the magnetic disk in a predetermined direction, thereby stably recording or reproducing a magnetic signal.

More specifically, even if a magnetic head is equipped with three or more contact pads, the object of the present invention is to enable the recording or reproduction of a correct error-free magnetic signal by providing softening portion for a part of the main unit which supports the contact pads to thereby prevent the magnetic head from causing resonance even if a vibrational force stemming from the run-out of the center of the shaft of the magnetic disk or irregular rotation of the magnetic disk is given to the magnetic head via the respective contact pads.

A contact magnetic head comprises: a main body; three or more contact pads which are provided on the main body, which are respectively contact with a magnetic disk, at least one of the contact pads sending a magnetic signal to or receiving the magnetic signal from the magnetic disk; and a softening portion formed in the main body for softening an area of the main body between the at least one contact pad for sending/receiving the magnetic signal and the other contact pads.

PREFERRED EMBODIMENT OF THE INVENTION

Preferred embodiments of the present invention will be described with reference to the accompanying drawings. In FIGS. 1 through 4, reference numeral 1 designates a support beam for supporting a contact magnetic head, and 2 designates an arm of the support beam 1. A mount portion of the head support arm 2 of a magnetic disk device is formed on the end of the arm 2 in the direction designated by arrow 3. Reference numeral 4 designates a head mount of the support beam 1; and 5 designates a flexible section which connects the arm 2 to the head mount 4. More specifically, the flexible section 5 connects the arm 2 to the head mount 4 so that the head mount 4 freely moves in directions designated by arrows 4a, 4b with respect to the arm 2. The support beam 1 is made up of three layers, i.e., a first layer 6, a second layer 7, and a third layer 8. The first layer 6 is a signal conduction layer for permitting the flow of an electrical signal and also serves as an elastic layer which provides the flexible section 5 with elasticity so that the head mount 4 deflects in the directions designated by the arrows 4a, 4b. In order to provide the first layer 6 with the functions of serving as the signal conduction layer and the elastic layer, the first layer 6 is formed from material having conductivity and elasticity. For example, the first layer 6 is formed from stainless steel having a thickness of about 10 μm. The third layer 8 is a rigid body layer for providing the rigidity of the support beam 1 supporting the contact magnetic head for the arm 2, the mount portion, and the head mount 4. For example, the third layer 8 is formed from stainless steel to a thickness of about 25 μm. The second layer 7 electrically insulates the signal layer 6 from the rigid body layer 8 and also serves as an adhesive layer for mechanically combining the signal layer 6 and the rigid body layer 8 into one unit. For example, the second layer 7 is formed from epoxy or polyimide to a thickness of about 25 μm. Holes 9 formed in the head mount 4 are used for mechanically mounting the magnetic head on the head mount 4 and electrically connecting them together. The holes 9 are formed only in the second layer 7 and the third layer 8. Connection pads contained in the magnetic head are mechanically and electrically connected to the signal conduction layer 6 of the head mount 4 through the holes 9 by means of, e.g., ultrasonic bonding. Reference numeral 10 designates a spring for giving a contact pressure to the magnetic head to contact with a magnetic disk. The contact pressure is given to the magnetic head by pressing the head mount 4 by means of a tip end 10a.

Figure 1:
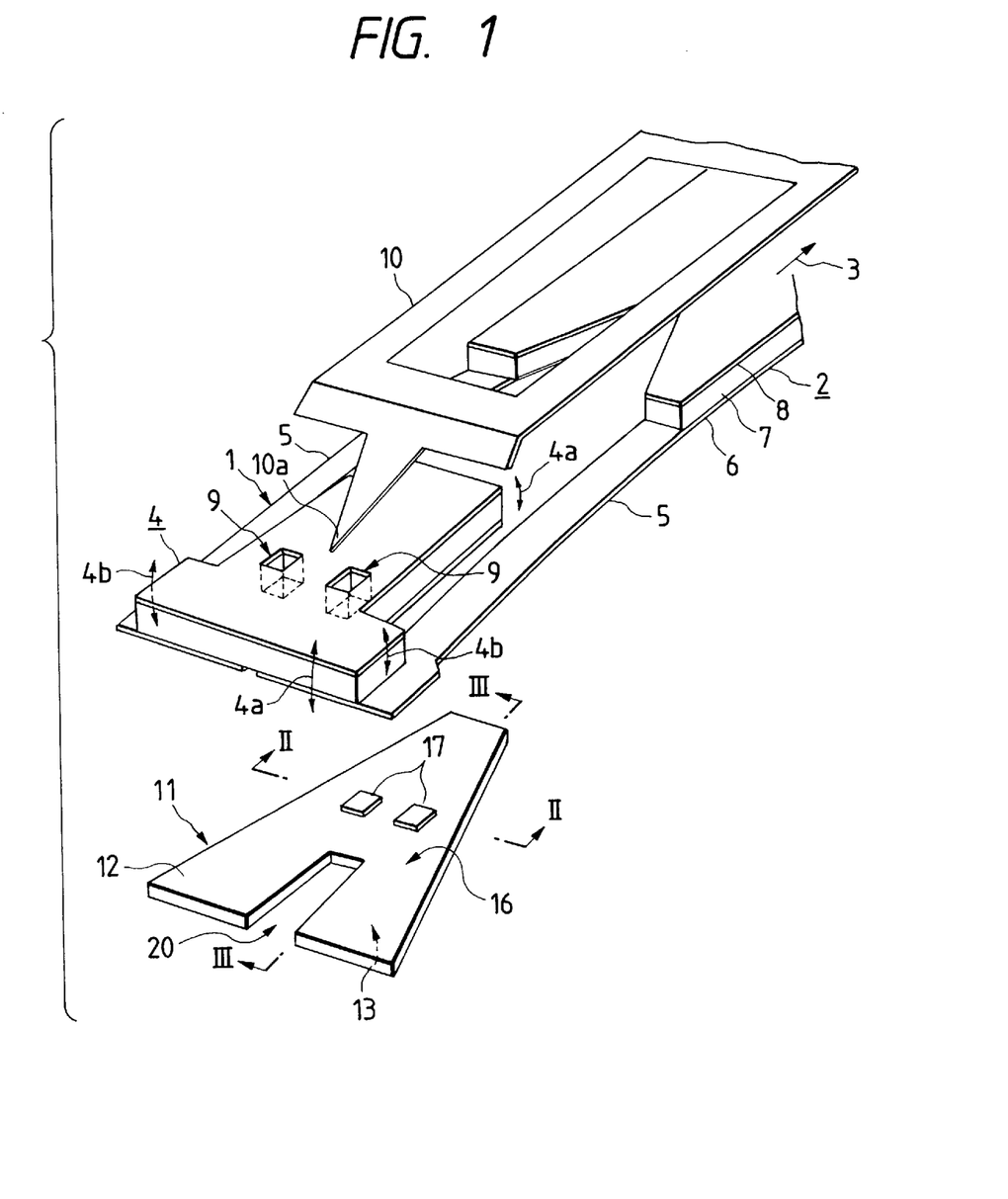
FIG. 1 is an exploded perspective view showing the relationship between a contact magnetic head, a support beam, and a contact pressure giving spring.
Figure 2:
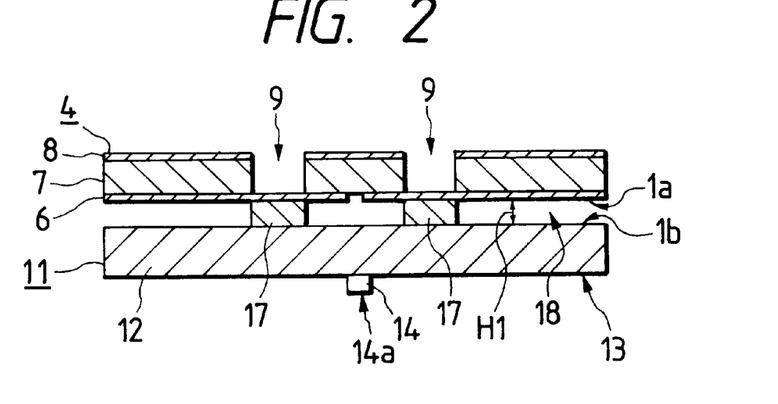
FIG. 2 is a cross-sectional view showing the relationship between the contact magnetic head and the support beam (across line II—II in FIG. 1)
Figure 3:
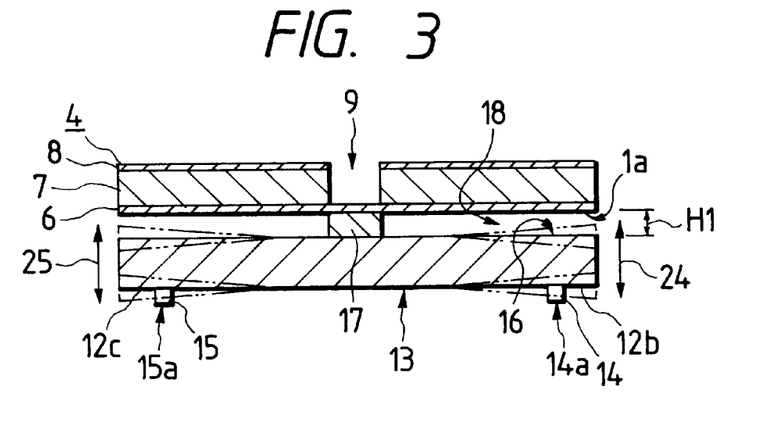
FIG. 3 is a cross-sectional view showing the relationship between the contact magnetic head and the support beam (across line III—III in FIG. 1)
Figure 4:
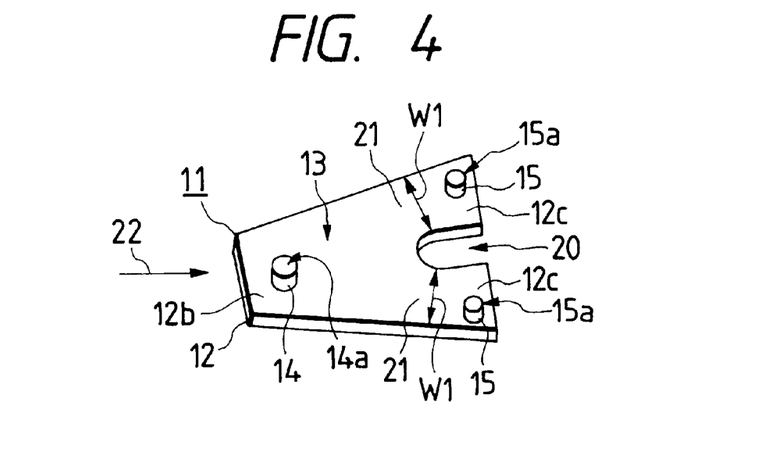
FIG. 4 is a perspective view showing the surface of the contact magnetic head which faces a magnetic disk.

Reference numeral 11 designates a contact magnetic head, and 12 designates a main body of the contact magnetic head 11 having a structural body and a conversion section. The conversion section (which is omitted from FIGS. 2 and 3) is embedded into the structural body and converts an electrical signal into a magnetic signal, and vice versa. For example, the structural body is formed from an insulating material such an silicon dioxide, alumina, or polyimide resin, and the conversion section is formed from a magnetic core and a coil. Reference numeral 13 designates a surface of the main body 12 which faces the magnetic disk (hereinafter referred to as a disk-facing surface). Reference numerals 14, 15 designate contact pads which respectively contact with the surface of the magnetic disk. Of these contact pads, the contact pad 14 is a contact pad which sends a magnetic signal to or receives it from the magnetic disk, namely, a magnetic pad for recording a signal on or reproducing the signal from the magnetic disk. In order to improve the transmission efficiency of a magnetic flux between the magnetic disk and the magnetic pad 14, the magnetic pad 14 is designed so as to record a signal on or reproduce the signal from the magnetic disk while remaining in contact with the surface of the magnetic disk. In the main body 12, the magnetic pad 14 is magnetically connected to a magnetic core of the conversion section. The contact pads 15 are auxiliary pads which contact with the surface of the magnetic head in order to hold the magnetic pad 14 in a predetermined position (or at an angle) with respect to the surface of the magnetic head. Tip-end surfaces 14a, 15a (hereinafter referred to as contact portions) of the magnetic pad 14 and the auxiliary pads 15 contact with the surface of the magnetic disk. The two contact pads 15 are provided so that the magnetic head contacts with the magnetic disk at three points in conjunction with the magnetic pad 14 to thereby render the positional relationship between the magnetic head and the magnetic disk stable. However, three or more contact pads 15 may be provided for the magnetic head. The magnetic pad 14 and the auxiliary pads 15 are formed to have a diameter of, e.g., 20 μm, and a height of, e.g., 3 μm with respect to the surface of the disk-facing surface 13. Reference numeral 16 designates the surface of the main body 12 which is opposite to the disk-facing surface 13 and faces the support beam 1 (hereinafter referred to as a beam-facing surface). Reference numeral 17 designates connection pads used for mechanically mounting the magnetic head 11 on the support beam 11 and electrically connecting them together. The connection pads 17 are fixed to the main body 12 and are electrically connected to a coil of the conversion section. These connection pads 17 are bonded to the signal conduction layer 6 of the head mount 4 by ultrasonic bonding. However, they may be bonded together by soldering instead of by ultrasonic bonding. Reference numeral 18 designates a clearance formed between a surface 1a of the support beam 1 which faces the magnetic head 11 (hereinafter referred to as a head-facing surface) and the beam-facing surface 16 of the main body 12 while the magnetic head 11 is mounted on the support beam 1. For example, the height H1 of the clearance 18 is preferably set so as to become larger than the extent of expected deformation of the main body 12, e.g., the magnitude of an amplitude of vibration of the main body 12, in order to enable flexible deformation of the main body 12 which will be described later. In this embodiment, for example, the clearance 18 can be formed by protruding the connection pads 17 from the beam-facing surface 16. In another example, another member for ensuring the formation of the clearance 18 may be interposed between the connection pads 17 and the conduction layer 6 before the connection pads 17 are bonded to the conduction layer 6.

Reference numeral 20 designates a notch portion formed in a part of the main body 12. The notch portion 20 is one example to be formed in the main body 12 for softening the area of the magnetic head 11 between the contact pads 15 and the magnetic pad 14 for sending the magnetic signal to or receiving it from the magnetic disk. The word "softening" used herein means to prevent an area 12b of the main body 12 provided with the magnetic pad 14 from vibrating in conjunction with an area 12c of the main body 12 provided with the other contact pads 15. This softening can be effected by forming a softening section for the purposes of preventing the areas 12b, 12c from vibrating integrally between the area 12b of the main body 12 provided with the magnetic pad 14 and the area 12c provided with the contact pads 15. This notch portion 20 in one example for structurally forming the softening section in the main body 12 so that a softening section 21 having a narrow width W1 contributing as a softening shape is formed between the magnetic pad 14 and the auxiliary pads 15.

With the foregoing construction, the magnetic disk moves in a direction designated by arrow 22 in FIG. 4 while the magnetic pad 14 and the contact pads 15 remain in contact with the surface of the magnetic disk. In this state, an electrical signal delivered from a recording circuit is sent, via the signal conduction layer 6 and the connection pad 17 of the support beam 1, to the conversion section of the magnetic head 11 where the signal is converted into a magnetic signal. The magnetic signal is recorded on the magnetic disk via the magnetic pad 14, or conversely, the magnetic signal of the magnetic disk is delivered, via the magnetic pad 14, to the conversion section of the magnetic head 11 where it is converted into the electrical signal. This electrical signal is sent to a reproduce circuit via the connection pad 17 and the conduction layer 6 of the support beam 1.

In the case of record or reproduce of the signal, the magnetic pad 14 and the auxiliary pads 15 contact with the surface of the magnetic disk at a total of three points. Hence the magnetic pad 14 stably contacts with the magnetic disk in a predetermined direction with respect to the magnetic disk. As a result, the magnetic signal can be stably recorded or reproduced.

If the run-out of the center of the shaft of the magnetic disk or irregular rotation of the magnetic disk occurs in the foregoing case, vibrational force resulting from the run-out or irregular rotation is given to the magnetic head 11 via the magnetic pad 14 and the auxiliary pads 15. However, the softening section 21 is formed in the area of the main body 12 between the area 12b equipped with the magnetic pad 14 and the area 12c equipped with the auxiliary pads 15, thereby enabling the areas 12b, 12c to deflect in the directions designated by 24, 25 as shown in FIG. 3. More specifically, the overall magnetic head 11 is prevented from resonating like a single unit. As a result, the contact portion 14a of the magnetic pad 14 and the contact portion 15a of the auxiliary pads 15 follows the surface of the magnetic disk and can remain in suitable contact with the surface. Since the contact portion 14a of the magnetic head 14 can be maintained in suitable contact with the surface of the magnetic disk, the magnetic signal can be correctly recorded or reproduced without errors.

Figure 5A:
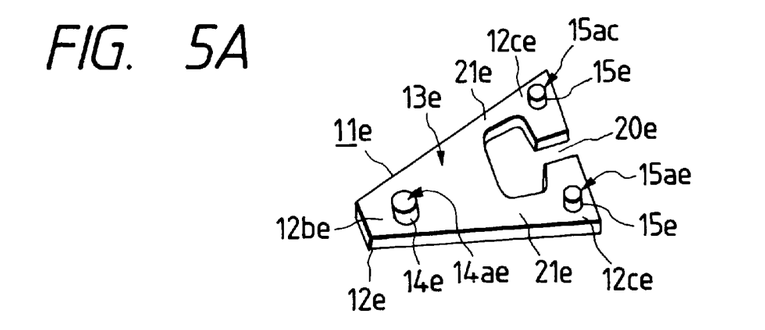
FIGS. 5A to 5C are perspective views showing various examples of softening means created in the form of notches formed in part of the profile of the main body.
Figure 5B:
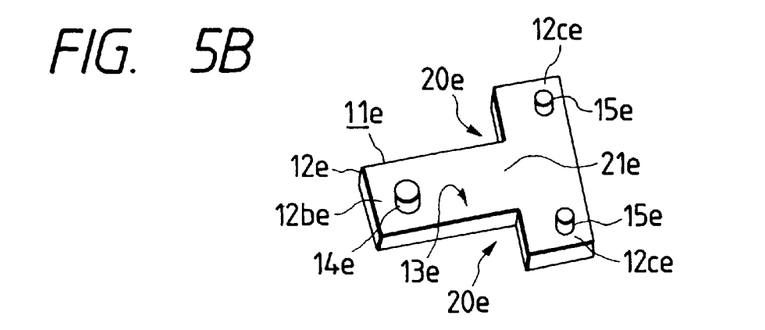
Figure 5C:
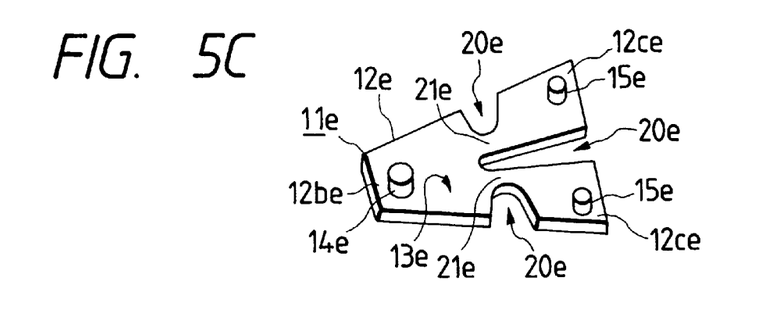
Figure 5D:
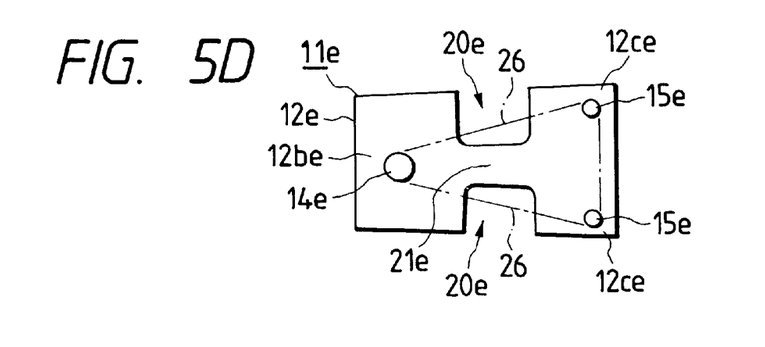
FIG. 5D is a bottom view showing another example of the softening means.

FIGS. 5A to 5D show various examples of notch portions 20e which are formed in a main body 12e so as to form a softening section 21e in the main body 12e in various forms. As shown in FIG. 5D, for example, it is desirable to form the notch portion 20e in such a way that the outline of the areas of the main body 12e where the notches 20e are formed becomes recessed in an inward direction with respect to virtual lines 26 connecting a magnetic pad 14e to contact pads 15e. The same reference numerals, each of which is suffixed with letter "e" of the alphabet, are assigned to the elements which are deemed to result in an overlapping of description because they are the same in function as, or equivalent in construction to, those provided in the previous drawings, and hence their overlapping explanations will be omitted. (The same applies to the following drawings. Letters "f," "g," . . . of the alphabet will be, in that order, suffixed to the corresponding reference numerals in the following drawings.) In addition, as shown in FIG. 5A, a notch portion may be cut to be deeper than the notch 20 as shown in FIG. 4 and the width of the notch in the deep side is wider than the width of the notch in the side of the opening portion to form notch 20e. Further, as shown in FIG. 5B, the main body may be formed to be substantially T-shape to form notch portions 20e. Moreover, as shown in FIG. 5C, a shallow notch 20e may be formed between the magnetic pad 14e and each of the other two pads 15e while a deep notch 20e may be formed between the two pads 15e.

Figure 6A:
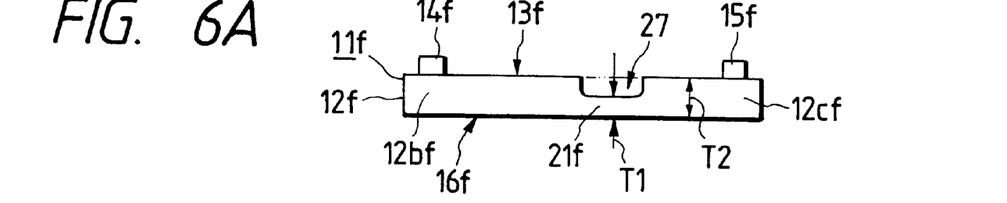
FIG. 6A is a side view showing an example in which a groove is formed in a disk-facing surface of a main body.
Figure 6B:
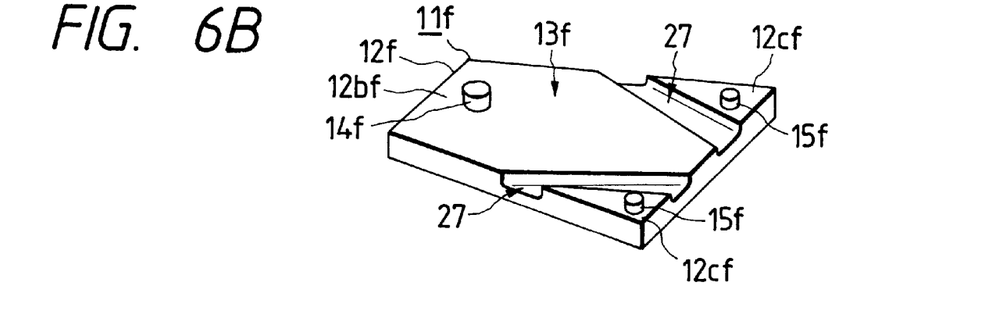
FIG. 6B and FIG. 6C are perspective views respectively showing different examples of the groove formed in the disk-facing surface.
Figure 6C:
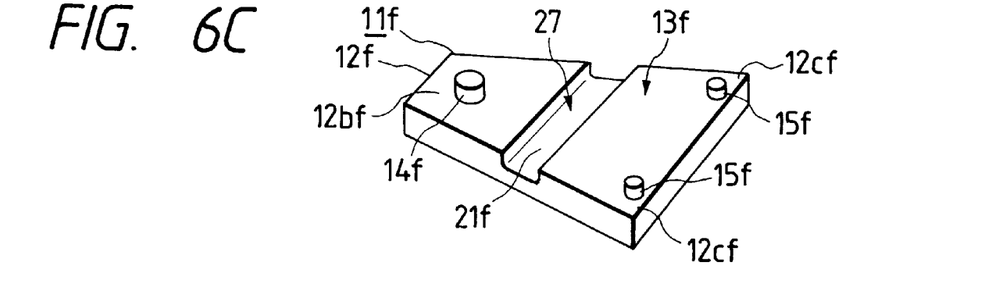
Figure 6D:
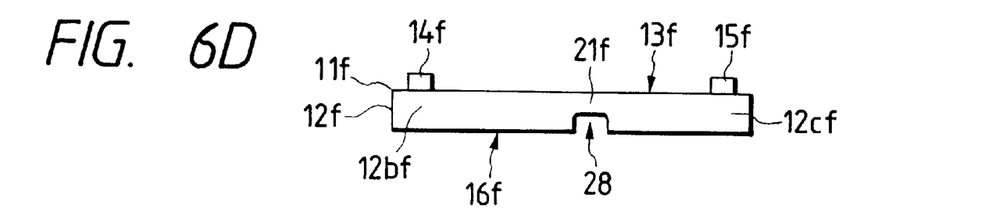
FIGS. 6D and 6E are side views showing different examples of the positions on the main body where the groove is formed.
Figure 6E:
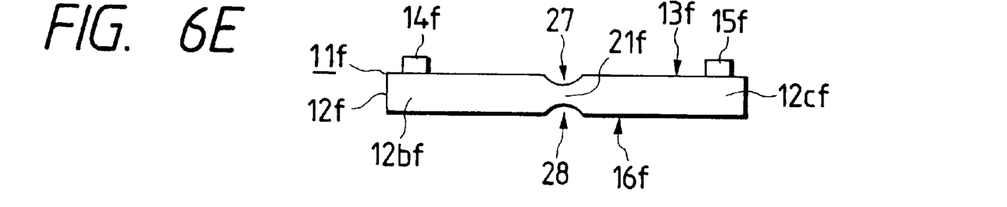

FIGS. 6A to 6E show other examples of a softening section 21f created in a main body 12f in some forms for softening the area of the main body 12f between the area of the main body 12f equipped with a magnetic pad 14f and the area of the same equipped with contact pads 15f. The drawings illustrate examples in which the softening section 21f is formed by reducing the thickness T1 of a certain area(s) between an area 12bf of the main body 12f equipped with the magnetic pad 14f and an area 12cf of the same equipped with the contact pads 15f so as to become smaller than the thickness T2 of the other area of the main body 12f. FIG. 6A shown an example in which a groove 27 is formed on a disk-facing surface 13f. The groove 27 may be made in the form, e.g., shown in FIG. 6B or FIG. 6C. FIG. 6D shows an example in which a groove 28 is formed in a beam-facing surface 16f, and FIG. 6E shows an example in which grooves 27, 28 are formed in the disk-facing surface 13f and the beam-facing surface 16f, respectively. Each of the grooves 27, 28 may be formed in either a straight line or a curve. Further, the grooves 27, 28 may be filled with a substance whose hardness is smaller than that of the structural material of the main body 12f.

Figure 7:
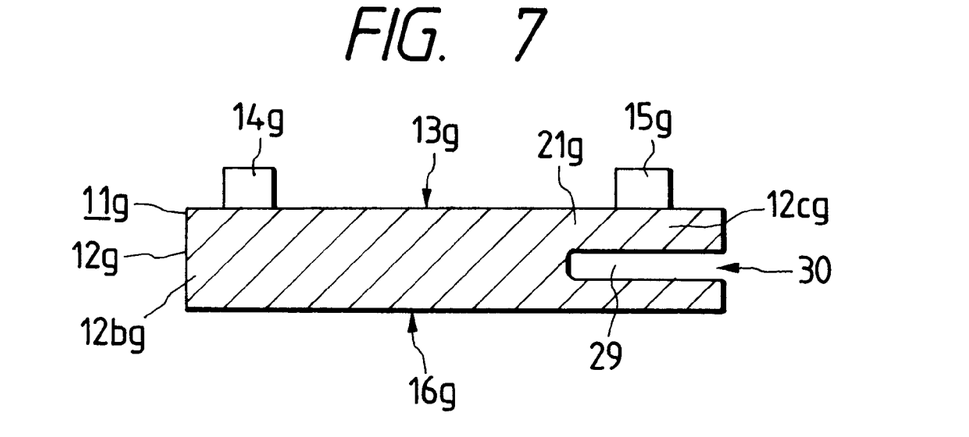
FIG. 7 is a cross-sectional view showing an example in which an aperture is formed as softening means in a part of the inside of the main body.

FIG. 7 shows another example for forming a structural softening section 21g in a main body 12g in a certain form. The drawing shows an example in which an aperture 29 is formed in the main body 12g so as to have an opening 30 facing the outside of the main body 12g in order to form the softening section 21g whose thickness is smaller than that of the other area between an area 12bg equipped with a magnetic pad 14g and an area 12cg equipped with the other contact pads 15g. The opening 30 may be formed in the side surface, the disk-facing surface 13g, or the beam-facing surface 16g of the main body 12g.

Figure 8A:
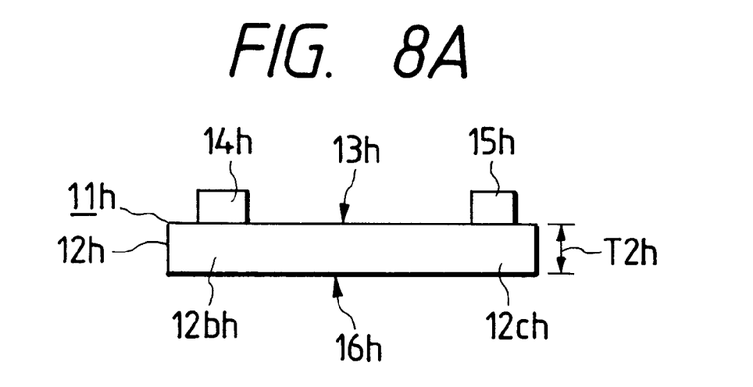
FIG. 8A is a side view showing an example in which the softening means is implemented by the reduction in the thickness of the main body.
Figure 8B:
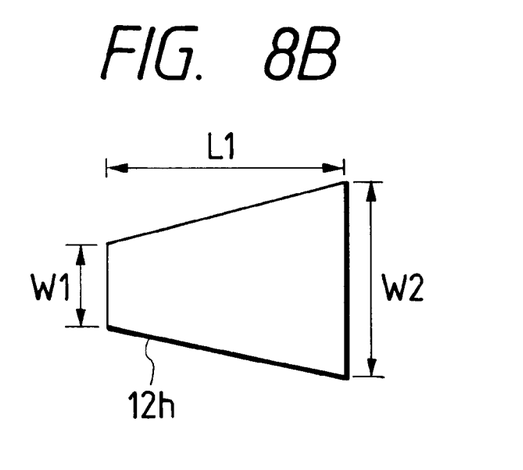
FIG. 8B is a plan view showing one example of the profile of the contact magnetic head.
Figure 9:
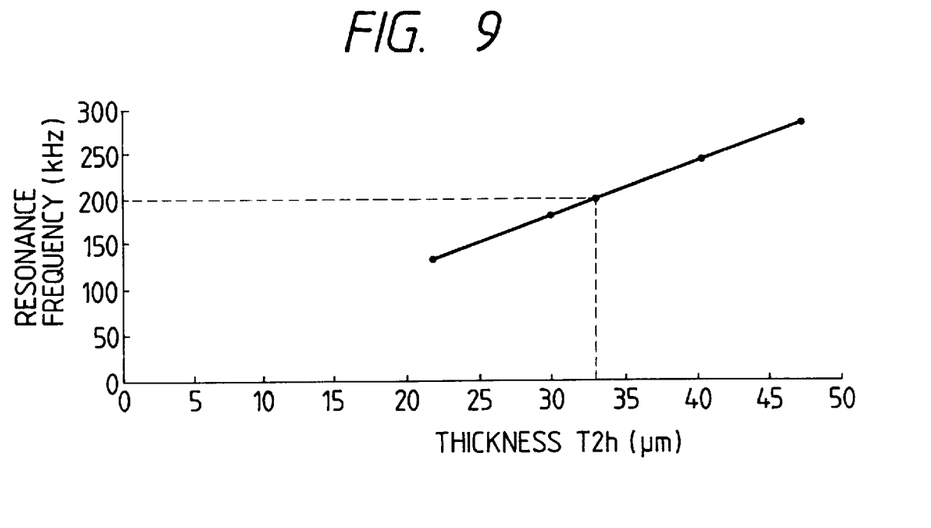
FIG. 9 is a plot showing one example of the relationship between the thickness of the main body and the resonance frequency.

FIGS. 8A and 8B show another example for softening the area between a magnetic pad 14h and contact pads 15h of a main body 12h. The drawings show an example in which a magnetic head 11h is prevented from being affected by the recording or reproduce of the magnetic signal performed by the magnetic pad 14h by reducing the thickness T2h of a main body 12h until the frequency at which the magnetic head 11h resonates is reduced to a frequency which allows the support beam to absorb vibration, e.g., less than about 200 kHz. For example, if the main body 12h shown in FIG. 8B has the dimensions W1=0.3 mm, W2=0.75 mm, and L1=1.0 mm, the relationship between the thickness T2h and the resonance frequency becomes a graph such as that shown in FIG. 9. Accordingly, for the case of the magnetic head having the foregoing dimensions, the thickness T2h should preferably be set to a value less than 33 µm.

In the contact magnetic head having three contact points according to the present invention, the contact travelling stability is defined by hardness as the dynamics system and the density. Specifically, since there are no structural materials for the magnetic head except ceramics, the density in determined in substantially the same value. Accordingly, the stability may be defined by the hardness.

The hardness as the dynamics system can be calculated by the following expression:

$$(\text{hardness}) \, (L1)^3 / \{(E^*(W1+W2)^*(T2h)^3)\}$$

E: Young's Modulus of structural materials of head
(Other symbols are defined in FIGS. 8A and 8B)

In actual experimentations, in a case of E=35,000 kgf/nmn², W1=0.35 mm, W2=0.93 mm, T2h=0.04 mm, L1=1.36 mm and the hardness according to above expression was 0.88 mm/kgf, namely, in a case of the hardness where 0.88 mm deformation was generated with respect to 1 kgf, almost all heads travelled in stable contact. On the other hand, E1=35,000 kgf/mm², W1=0.35 mm, T2h=0.04 mm, W2=0.75 mm, L1=1.05 mm and the hardness according to the above expression was 0.47 mm/kgf, merely about 20% of heads travelled in stable contact.

Therefore, in accordance with the above experimentations, it is considered that the value of the above expression should be not less than 0.25 mm/kgf to accomplish the contact travel stability.

Figure 10A:
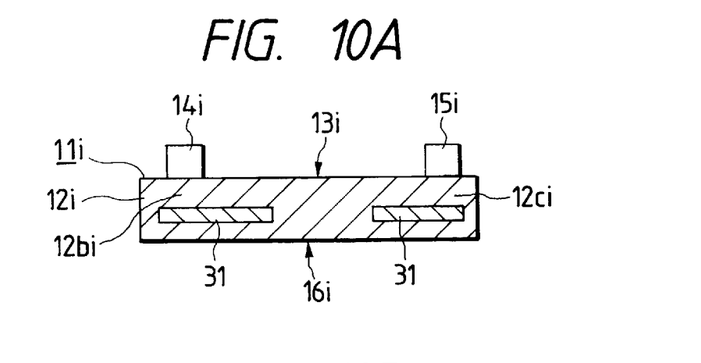
FIGS. 10A and 10B are cross-sectional views showing examples in which the softening means is formed by a substance of low hardness embedded in a part of the main body.
Figure 10B:
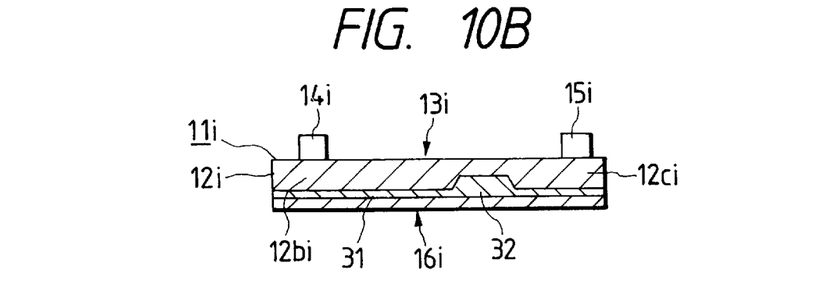

FIGS. 10A and 10B show the use of a softening substance as still another example for softening the area of a main body 12$i$ between a magnetic pad 14$i$ and contact pads 15$i$. The drawings show an example in which a substance 31 whose hardness is lower than that of the structural body of a main body 12$i$ is embedded, as a softening substance, in the area of the main body 12$i$ between an area 12$bi$ equipped with a magnetic pad 14$i$ and an area 12$ci$ equipped with contact pads 15$i$ of the main body 12$i$. The substance 31 may be embedded in two areas as shown in FIG. 10A or in one of these areas. Alternatively, as shown in FIG. 10B, the substance 31 may be embedded in such a way as to form an area 32 having a large thickness in part of the inside of the main body 12$i$. Organic substances such as photo-resist or polyimide or nonmagnetic metals such as gold, copper, or zinc, may be used as the substance 31.

Figure 11A:
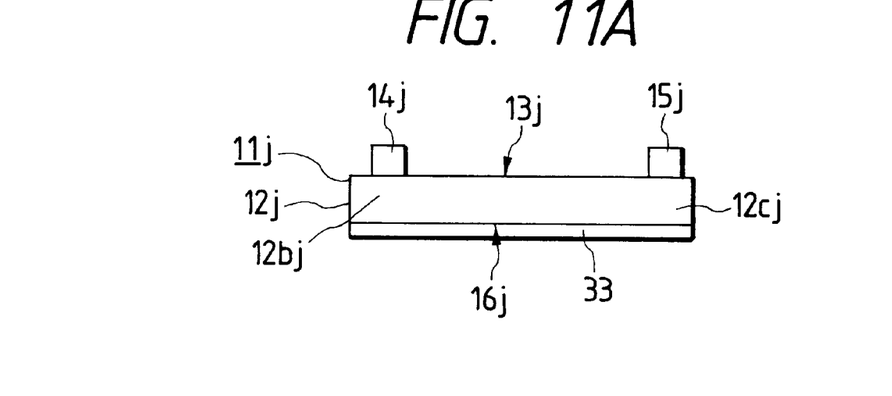
FIG. 11A is a side view showing another example showing the configuration of a bonding section which bonds the contact magnetic head to the support beam.
Figure 11B:
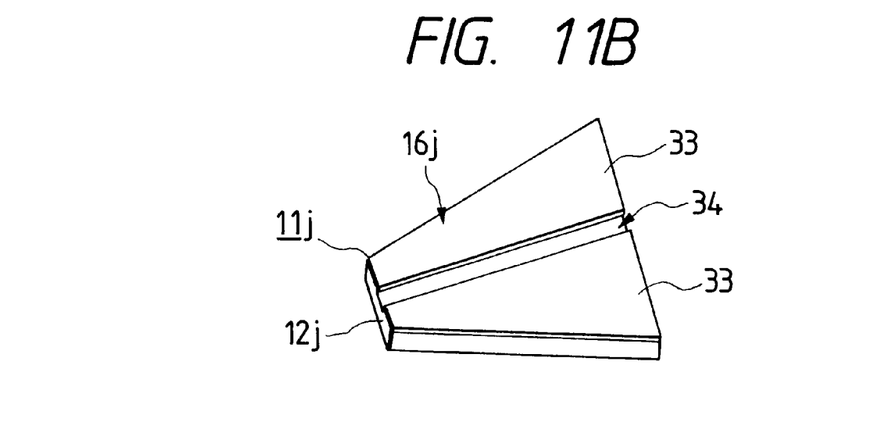
FIG. 11B is a perspective view of the example shown in FIG. 11A.

FIGS. 11A and 11B show another example of the use of a softening substance in a main body 12$j$. In this example, a softening substance 33, such as a metal or conductive adhesive, has electrical conductivity and is lower in hardness than that of the main body 12$j$. The overall surface of a magnetic head 11$j$ including a connection pad is directly connected to the support beam by means of the softening substance 33. Reference numeral 34 designates a slit for preventing a short circuit occurring between connection pads having opposite polarities.

Figure 12:
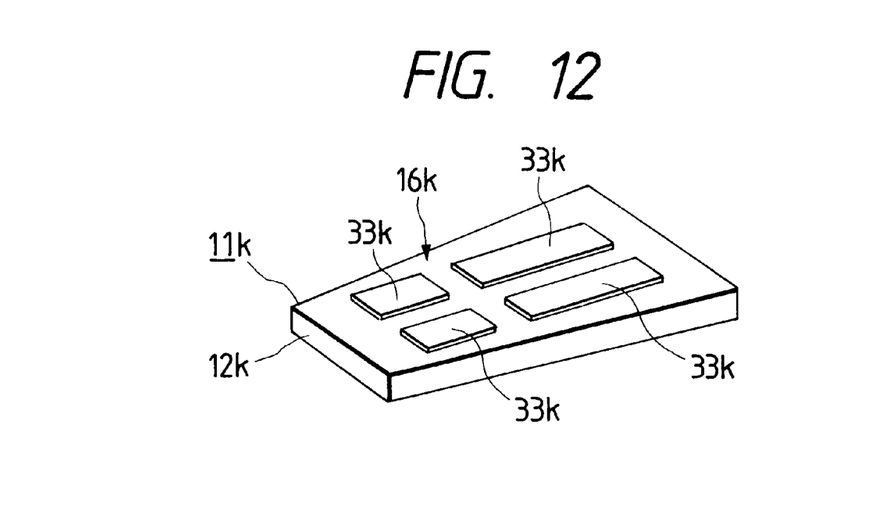
FIG. 12 is a perspective view showing still another example showing the configuration of the bonding section which bonds the contact magnetic head to the support beam.

FIG. 12 shows an embodiment in which the softening substance 33$k$ same as that used in the example shown in FIG. 11 is used in case of the main body having four electrodes, i.e., four connection pads. The electrodes are connected to the support beam by means of small separated pieces of the softening substance 33$k$. In this embodiment and the embodiment shown in FIG. 12, it is also possible to expect the effect of attenuating the amplitude of the magnetic head by means of the softening substances 33, 33$k$. The use of the softening substance in the examples shown in FIGS. 10 through 12 and the formation of the softening section in the examples shown in FIGS. 1 through 8 may be combined with each other.

As described, in accordance with the present invention, in a case where a magnetic signal is recorded on, or reproduced from, a magnetic disk through use of the magnetic head 11, the three or more contact pads 14, 15 come into contact with the magnetic disk. Therefore, the magnetic pad 14 of the contact pads 14, 15 stably comes into contact with the magnetic disk in a predetermined direction. As a result, the magnetic pad 14 in the stable state can record or reproduce the magnetic signal more stably.

In the foregoing case, even in a case where the three or more contact pads 14, 15 come into contact with the magnetic disk, the area between the magnetic pad 14 and the contact pads 15 is softened. Accordingly, even if the run-out of the center of the shaft of the magnetic disk or irregular rotation of the magnetic disk occurs, and if vibrational force resulting from the run-out or the irregular rotation is given to the magnetic head 11 via the respective contact pads 14, 15, the magnetic head 11 can be prevented from resonating. Consequently, the magnetic pad 14 can be maintained in contact with the surface of the magnetic disk, and hence the intensity of the magnetic signal to be recorded on the magnetic disk or of the magnetic signal to be reproduced from the magnetic disk, can be stably maintained, thereby enabling accurate recording or reproduce of the magnetic signal without errors.

What is claimed is:

1. A contact magnetic head comprising:

a main body;

at least three contact pads which are provided on said main body, which are respectively in contact with a magnetic disk, at least one of said contact pads being arranged to send a magnetic signal to or receive the magnetic signal from the magnetic disk; and a softening portion formed in said main body between said at least one of said contact pads arranged to send or receive the magnetic signal and the other contact pads, wherein said softening portion has a hardness of at least 0.25 mm/kgf.

2. A contact magnetic head according to claim 1, wherein said softening portion has at least one notch portion.

3. A contact magnetic head according to claim 1, wherein said softening portion has at least one groove.

4. A contact magnetic head according to claim 3, wherein said groove is provided on at least one surface of said main body.

5. A contact magnetic head according to claim 1, wherein said softening portion in a softening material having a hardness lower than that of said main body, which is embedded in at least a part of said main body.

6. A contact magnetic head according to claim 5, wherein said softening materials are individually provided to correspond to said contact pads.

7. A contact magnetic head according to claim 1, wherein said softening portion is made of a conductive material, which is provided on a beam-facing surface of said main body.

8. A contact magnetic head according to claim 7, wherein said softening materials are individually provided to correspond to said contact pads.

* * * * *